United States Patent
Kim

(10) Patent No.: US 12,534,076 B2
(45) Date of Patent: Jan. 27, 2026

(54) APPARATUS FOR DRIVING ASSISTANCE, VEHICLE INCLUDING THE SAME, AND METHOD FOR DRIVING ASSISTANCE

(71) Applicant: HL KLEMOVE CORP., Incheon (KR)

(72) Inventor: Hyungjune Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 213 days.

(21) Appl. No.: 18/402,725

(22) Filed: Jan. 3, 2024

(65) Prior Publication Data

US 2024/0326794 A1   Oct. 3, 2024

(30) Foreign Application Priority Data

Mar. 27, 2023  (KR) .......................... 10-2023-0039846

(51) Int. Cl.
*B60W 30/095* (2012.01)
*B60W 50/00* (2006.01)

(52) U.S. Cl.
CPC ........ *B60W 30/0956* (2013.01); *B60W 50/00* (2013.01); *B60W 2050/005* (2013.01); *B60W 2420/408* (2024.01); *B60W 2554/20* (2020.02)

(58) Field of Classification Search
CPC ..... B60W 2050/005; B60W 2420/408; B60W 2552/50; B60W 2554/20; G06T 5/70; G06T 2207/20182; G06V 20/58
See application file for complete search history.

(56) References Cited

U.S. PATENT DOCUMENTS

| 2021/0264173 A1* | 8/2021 | Wang | G06T 7/277 |
| 2022/0398856 A1* | 12/2022 | Quan | G06T 7/11 |

FOREIGN PATENT DOCUMENTS

| JP | 2007-13773 | 1/2007 |
| JP | 2020-30173 | 2/2020 |
| KR | 10-2017-0056339 | 5/2017 |
| KR | 10-1989434 | 6/2019 |
| KR | 10-2020-0054373 | 5/2020 |
| KR | 10-2021-0031011 | 3/2021 |

OTHER PUBLICATIONS

Office Action dated Nov. 29, 2024 for Korean Patent Application No. 10-2023-0039846 and its English translation provided by Applicant's foreign counsel.

* cited by examiner

*Primary Examiner* — Anshul Sood
(74) *Attorney, Agent, or Firm* — WOMBLE BOND DICKINSON (US) LLP

(57) ABSTRACT

Disclosed herein is an apparatus for driving assistance. The apparatus includes at least one memory configured to store a program for identifying a guardrail, and at least one processor configured to execute the stored program and identify the guardrail based on detection data indicating information about an surrounding environment of a vehicle and behavior data indicating information about behavior of the vehicle, and the at least one processor identifies the guardrail by applying a Gaussian noise model to the detection data.

20 Claims, 10 Drawing Sheets

APPARATUS FOR DRIVING ASSISTANCE, VEHICLE INCLUDING THE SAME, AND METHOD FOR DRIVING ASSISTANCE

CROSS-REFERENCE TO RELATED APPLICATION

This application claims the benefit of Korean Patent Application No. 10-2023-0039846, filed on Mar. 27, 2023 in the Korean Intellectual Property Office, the disclosure of which is incorporated herein by reference.

BACKGROUND

1. Field

Embodiments of the present disclosure relate to an apparatus for driving assistance capable of more accurately identifying a guardrail, a vehicle including the same, and a method for driving assistance.

2. Description of the Related Art

In recent years, in order to relieve a driver's burden and increase his or her convenience, studies regarding vehicles equipped with an advanced driver assistance system (ADAS) that collects information related to a state of a vehicle, a state of the driver, or a surrounding environment and actively controls the vehicles based on the collected information have been actively in progress.

For example, the ADAS mounted on the vehicle may perform functions such as lane departure warning (LDW), lane keeping assist (LKA), high beam assist (HBA), autonomous emergency braking (AEB), traffic sign recognition (TSR), adaptive cruise control (ACC), blind spot detection (BSD), or the like.

SUMMARY

Therefore, it is an aspect of the present disclosure to provide a driving assistance apparatus capable of more accurately identifying a guardrail even in situations where there are structures around the guardrail that may interfere with guardrail identification, a vehicle including the same, and a method for driving assistance.

In accordance with one aspect of the present disclosure, an apparatus for driving assistance includes a radar installed in a vehicle, having a detection region outside the vehicle, and configured to provide detection data indicating information about a surrounding environment of the vehicle, and at least one memory configured to store a program for identifying a guardrail, at least one processor configured to execute the stored program and identify the guardrail based on the detection data and behavior data indicating information about behavior of the vehicle, in which the at least one processor is configured to identify the guardrail by applying a Gaussian noise model to the detection data.

The at least one processor may apply the Gaussian noise model based on a central region of guardrail detection data of a previous frame among the detection data.

The at least one processor may assign a weight to detection data corresponding to a central region of the Gaussian noise model.

The at least one processor may identify the guardrail by performing line fitting focusing on the weighted detection data.

The at least one processor may perform resampling on weighted data obtained by applying the Gaussian noise model.

The at least one processor may perform the resampling according to a size of the weight, and the number of samples subject to the resampling is four or less.

The at least one processor may identify the guardrail by performing line fitting on the detection data on which the resampling has been performed.

In accordance with another aspect of the present disclosure, a vehicle includes an environmental sensor configured to obtain detection data indicating information about a surrounding environment of the vehicle, a behavior sensor configured to obtain behavior data indicating behavior of the vehicle, at least one memory configured to store a program for identifying a guardrail, and at least one processor configured to execute the stored program and identify the guardrail based on the detection data and the behavior data, in which the at least one processor is configured to identify the guardrail by applying a Gaussian noise model to the detection data.

The at least one processor may apply the Gaussian noise model based on a central region of guardrail detection data of a previous frame among the detection data.

The at least one processor may assign a weight to detection data corresponding to a central region of the Gaussian noise model.

The at least one processor may identify the guardrail by performing line fitting focusing on the weighted detection data.

The at least one processor may perform resampling on weighted data obtained by applying the Gaussian noise model.

The at least one processor may perform the resampling according to a size of the weight, and the number of samples subject to the resampling is four or less.

The at least one processor may identify the guardrail by performing line fitting on the detection data on which the resampling has been performed.

In accordance with still another aspect of the present disclosure, a method for driving assistance includes obtaining, by a radar installed in a vehicle and having a detection region outside the vehicle, detection data indicating information about a surrounding environment of the vehicle, obtaining behavior data indicating behavior of the vehicle from a behavior sensor provided in the vehicle, and identifying a guardrail based on the detection data and the behavior data, in which the identifying of the guardrail includes identifying the guardrail by applying a Gaussian noise model to the detection data.

The identifying of the guardrail may include applying the Gaussian noise model based on a central region of guardrail detection data of a previous frame among the detection data.

The identifying of the guardrail by applying the Gaussian noise model may include assigning a weight to detection data corresponding to a central region of the Gaussian noise model.

The identifying of the guardrail by applying the Gaussian noise model may include identifying the guardrail by performing line fitting focusing on the weighted detection data.

The method may further comprise performing resampling on weighted data obtained by applying the Gaussian noise model.

The performing of the resampling may include performing the resampling according to a size of the weight, and the number of samples subject to the resampling is four or less.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
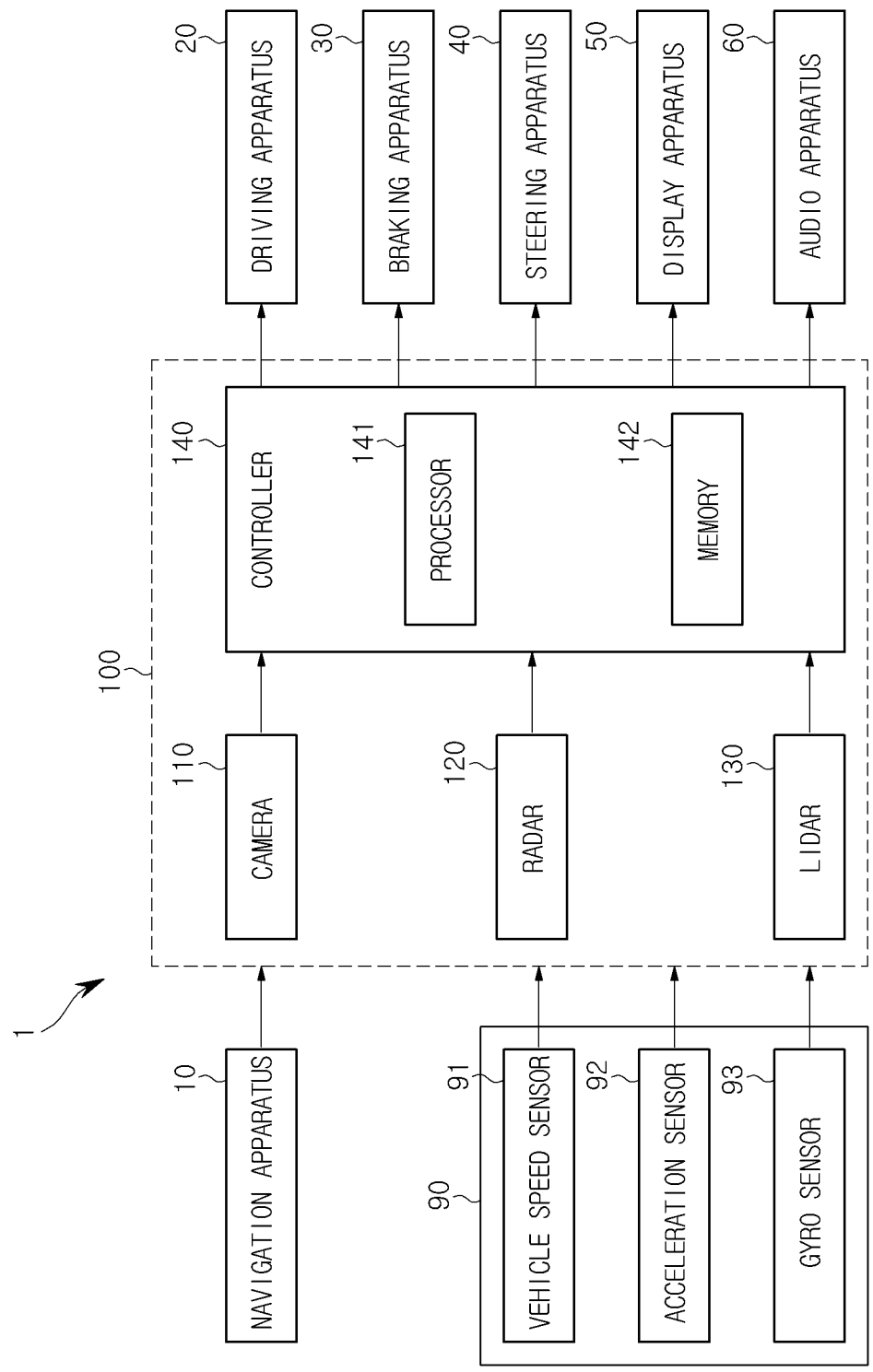
FIG. 1 illustrates configurations of a vehicle and a driving assistance apparatus in accordance with one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
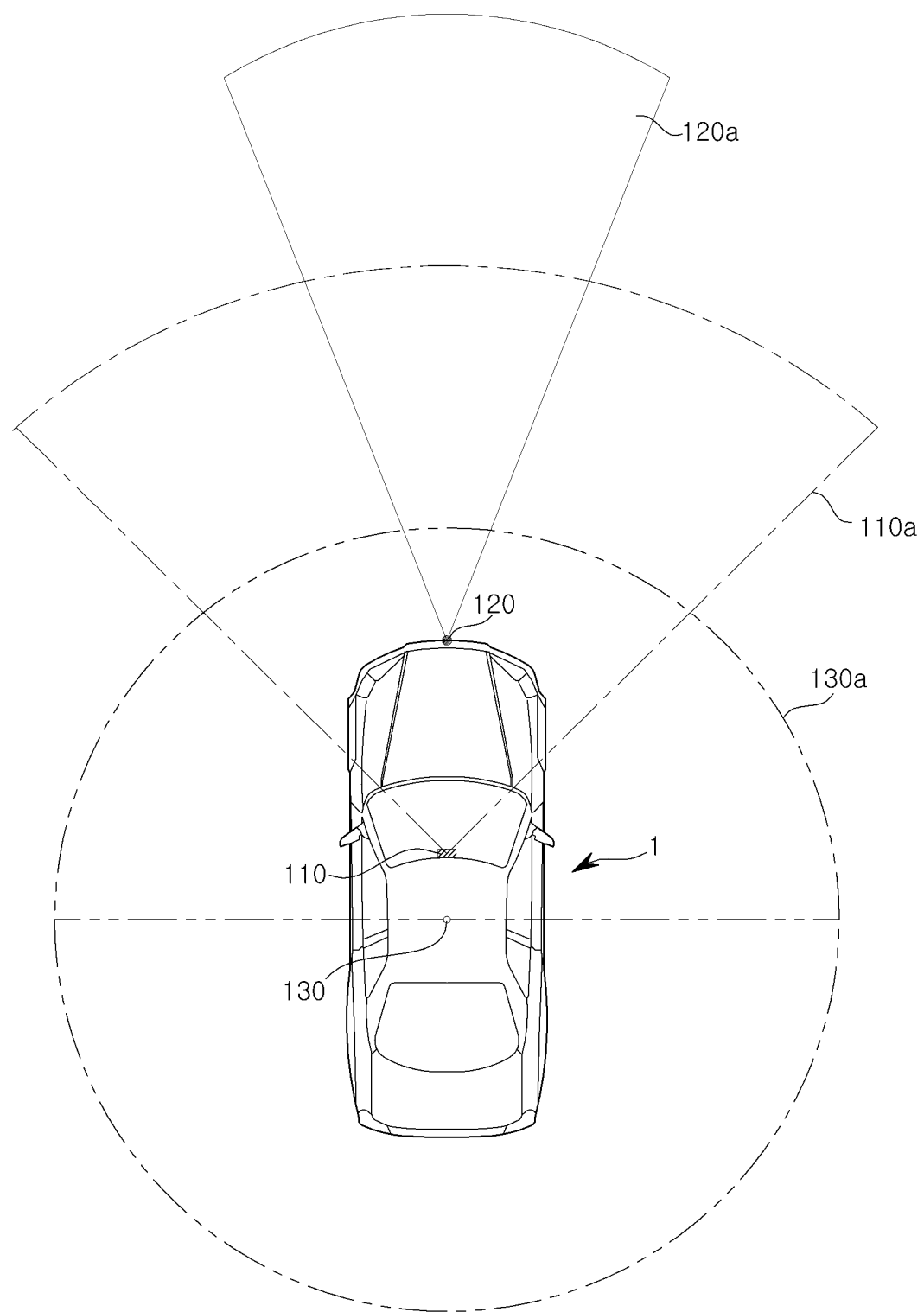
FIG. 2 illustrates fields of view of a camera, a radar, and a lidar included in a driving assistance apparatus in accordance with one embodiment.

FIG. 1 illustrates a configuration of a vehicle in accordance with one embodiment. FIG. 2 illustrates fields of view of a camera, a radar, and a lidar included in a driving assistance apparatus in accordance with one embodiment.

As illustrated in FIG. 1, a vehicle 1 may include a navigation apparatus 10, a driving apparatus 20, a braking apparatus 30, a steering apparatus 40, a display apparatus 50, an audio apparatus 60, and/or a driving assistance apparatus 100. In addition, the vehicle 1 may further include a behavior sensor 90 that detects dynamics of the vehicle 1. For example, the behavior sensor 90 may include a vehicle speed sensor 91 for detecting a longitudinal speed of the vehicle 1, an acceleration sensor 92 for detecting a longitudinal acceleration and a lateral acceleration of the vehicle 1, and/or a gyro sensor 93 for detecting a yaw rate, a roll rate, and a pitch rate of the vehicle 1.

These apparatuses and sensors may communicate with each other through a vehicle communication network (NT). For example, electrical devices 10, 20, 30, 40, 50, 60, 91, 92, 93, and 100 included in the vehicle 1 may transmit and receive data via Ethernet, Media Oriented Systems Transport (MOST), FlexRay, Controller Area Network (CAN), Local Interconnect Network (LIN), or the like.

The navigation apparatus 10 may generate a route to a destination input by a driver and provide the generated route to the driver. The navigation apparatus 10 may receive a global navigation satellite system (GNSS) signal from a GNSS and identify an absolute position (coordinates) of the vehicle 1 based on the GNSS signal. The navigation apparatus 10 may generate a route to the destination based on the position (coordinates) of the destination input by the driver and the current position (coordinates) of the vehicle 1.

The navigation apparatus 10 may provide map data and position information for the vehicle 1 to the driving assistance apparatus 100. In addition, the navigation apparatus 10 may provide information on the route to the destination to the driving assistance apparatus 100. For example, the navigation apparatus 10 may provide information such as a distance to an access road for the vehicle 1 to enter a new road or a distance to an exit road for the vehicle 1 to exit from a road currently driving to the driving assistance apparatus 100.

The driving apparatus 20 may move the vehicle 1 and include, for example, an engine, an engine management system (EMS), a transmission, and a transmission control unit (TCU). The engine may generate power for driving the vehicle 1, and the engine management system may control the engine in response to a driver's willingness to accelerate through an accelerator pedal or a request from the driving assistance apparatus 100. The transmission may reduce the power generated by the engine and transfer the reduced power to the wheels, and the transmission control unit may control the transmission in response to a driver's shift command through a shift lever and/or a request from the driving assistance apparatus 100.

The braking apparatus 30 may stop the vehicle 1 and include, for example, a brake caliper and an electronic brake control module (EBCM). The brake caliper may decelerate the vehicle 1 or stop the vehicle 1 using friction with a brake disc, and the electronic brake control module may control the brake caliper in response to a driver's willingness to brake through a brake pedal and/or a request from the driving assistance apparatus 100. For example, the electronic brake control module may receive a deceleration request including a deceleration rate from the driving assistance apparatus 100 and electrically or hydraulically control the brake caliper so that the vehicle 1 decelerates depending on the requested deceleration rate.

The steering apparatus 40 may include an electronic power steering control module (EPS). The steering apparatus 40 may change a driving direction of the vehicle 1, and the electronic power steering control module may assist the operation of the steering apparatus 40 so that the driver may easily operate the steering wheel in response to a driver's willingness to steer through a steering wheel. Further, the electronic power steering control module may control the steering apparatus in response to a request from the driving assistance apparatus 100. For example, the electronic power steering control module may receive a steering request including steering torque from the driving assistance apparatus 100 and control the steering apparatus so that the vehicle 1 is steered depending on the requested steering torque.

The display apparatus 50 may include a cluster, a head-up display, a center fascia monitor, and the like, and may provide various information and entertainment to the driver through images and sounds. For example, the display apparatus 50 may provide driving information about the vehicle 1, a warning message, or the like, to the driver.

The audio apparatus 60 may include a plurality of speakers and provide various information and entertainment to the driver through sound. For example, the audio apparatus 60 may provide driving information about the vehicle 1, a warning message, or the like, to the driver.

The driving assistance apparatus 100 may communicate with the navigation apparatus 10, the behavior sensor 90, the driving apparatus 20, the braking apparatus 30, the steering apparatus 40, the display apparatus 50, and the audio apparatus 60 through the vehicle communication network. The driving assistance apparatus 100 may receive information on the route to the destination and position information about the vehicle 1 from the navigation apparatus 10, and obtain information about vehicle speed, acceleration and/or angular velocity of the vehicle 1 from the behavior sensor 90.

The driving assistance apparatus 100 may provide various functions for safety to the driver. For example, the driving assistance apparatus 100 may provide a lane departure warning (LDW) function, a lane following assist (LFA) function, a high beam assist (HBA) function, an autonomous emergency braking (AEB) function, a traffic sign recognition (TSR) function, an adaptive cruise control (ACC) function, a blind spot detection (BSD) function, or the like.

The driving assistance apparatus 100 may include a camera 110, a radar 120, a lidar 130, and a controller 140. The driving assistance apparatus 100 is not limited to that illustrated in FIG. 1. For example, in the driving assistance apparatus 100 illustrated in FIG. 1, at least one sensing device among the camera 110, the radar 120, and the lidar 130 may be omitted or various sensing devices capable of detecting surrounding objects of the vehicle 1 may be added.

The camera 110, the radar 120, the lidar 130, and the controller 140 may be provided separately from each other. For example, the controller 140 may be installed in a housing separated from a housing of the camera 110, a housing of the radar 120, and a housing of the lidar 130. The controller 140 may exchange data with the camera 110, the radar 120, or the lidar 130 through a wide-bandwidth network.

In addition, at least some of the camera 110, the radar 120, the lidar 130, and the controller 140 may be provided in an integrated form. For example, the camera 110 and the controller 140 may be provided in one housing, the radar 120 and the controller 140 may be provided in one housing, or the lidar 130 and the controller 140 may be provided in one housing.

The camera 110 may photograph surroundings of the vehicle 1 and obtain image data of the surroundings of the vehicle 1. For example, the camera 110 may be installed on a front windshield of the vehicle 1 as illustrated in FIG. 2, and may have a field of view 110*a* facing the front of the vehicle 1.

The camera 110 may include a plurality of lenses and an image sensor. The image sensor may include a plurality of photodiodes that convert light into electrical signals, and the plurality of photodiodes may be arranged in a two-dimensional matrix.

The image data may include information on other vehicles, pedestrians, cyclists, or lane lines (markers distinguishing lanes) positioned around the vehicle 1.

The driving assistance apparatus 100 may include an image processor that processes the image data of the camera 110, and the image processor may be provided integrally with the camera 110 or integrally with the controller 140, for example.

The image processor may obtain the image data from the image sensor of the camera 110 and detect and identify objects around the vehicle 1 based on processing of the image data. For example, the image processor may classify objects around the vehicle 1 using image processing. The image processor may identify whether an object is another vehicle, a pedestrian, a cyclist, or the like, and assign an identification code.

The image processor may transmit data on objects (or positions and classification of the objects) around the vehicle 1 to the controller 140.

The radar 120 may transmit transmission radio waves toward the surroundings of the vehicle 1 and detect objects around the vehicle 1 based on reflected radio waves reflected from the surrounding objects. For example, the radar 120 may be installed on a grill or bumper of the vehicle 1 as illustrated in FIG. 2 and have a field of sensing 120*a* facing the front of the vehicle 1.

The radar 120 may include a transmission antenna (or a transmission antenna array) for radiating transmission radio waves toward the surroundings of the vehicle 1 and a reception antenna (or a reception antenna array) for receiving radio waves reflected from an object.

The radar 120 may obtain radar data from the transmission radio waves transmitted by the transmission antenna and reflected radio waves received by the reception antenna. The radar data may include position information (e.g., distance information) and/or speed information about objects positioned in front of the vehicle 1.

The driving assistance apparatus 100 may include a signal processor that processes the radar data of the radar 120, and the signal processor may be provided integrally with the radar 120 or integrally with the controller 140, for example.

The signal processor may obtain the radar data from the receive antenna of the radar 120 and generate data on motion of an object by clustering reflection points of reflected signals. The signal processor may obtain a distance to the object based on, for example, a time difference between a transmission time of a transmission radio wave and a reception time of a reflected radio wave, and obtain speed of the object based on a difference between a frequency of the transmission radio wave and a frequency of the reflected radio wave.

The signal processor may transfer data on motion of the object around the vehicle 1 obtained from the radar data to the controller 140.

The lidar 130 may transmit light (e.g., infrared rays) toward the surroundings of the vehicle 1 and detect a surrounding object around the vehicle 1 based on reflected light reflected from the surrounding object. For example, the lidar 130 may be installed on a roof of the vehicle 1 as illustrated in FIG. 2 and have a field of view 130a facing all directions around the vehicle 1.

The lidar 130 may include a light source (e.g., a light emitting diode, a light emitting diode array, a laser diode, or a laser diode array) emitting light (e.g., infrared rays), and an optical sensor (e.g., a photodiode or a photodiode array) that receives light (e.g., infrared rays). In addition, the lidar 130 may further include a driving apparatus for rotating the light source and/or the optical sensor as needed.

The lidar 130 may emit light through the light source and receive light reflected from the object through the light sensor while the light source and/or the light sensor rotates, thereby obtaining lidar data.

The lidar data may include relative positions (distances to and/or directions of surrounding objects) and/or relative speeds of the surrounding objects of the vehicle 1.

The image data obtained by the camera 110, the radar data obtained by the radar 120, and the lidar data obtained by the lidar 130 may obtain detection data indicating information about the surrounding environment of the vehicle 1. Accordingly, in the present specification, at least one sensor among the camera 110, radar 120, or lidar 130 may be referred to as an environmental sensor.

The driving assistance apparatus 100 may include a signal processor capable of processing the lidar data of the lidar 130, and the signal processor may be provided integrally with the lidar 130 or integrally with the controller 140, for example.

The signal processor may generate data on motion of an object by clustering reflection points by reflection light. The signal processor may obtain a distance to an object based on, for example, a time difference between a light transmission time and a light reception time. In addition, the signal processor may obtain a direction (or angle) of the object with respect to a driving direction of the vehicle 1 based on a direction in which the light source emits light when the optical sensor receives the reflected light. The signal processor may transfer data on motion of the object around the vehicle 1 obtained from the lidar data to the controller 140.

The controller 140 may be electrically connected to the camera 110, the radar 120 and/or the lidar 130. In addition, the controller 140 may be connected to the navigation apparatus 10, the driving apparatus 20, the braking apparatus 30, the steering apparatus 40, the display apparatus 50, the audio apparatus 60, and/or the behavior sensor 90 through the vehicle communication network NT.

The controller 140 may process the image data of the camera 110, the radar data of the radar 120, and/or the lidar data of the lidar 130 and provide control signals to the driving apparatus 20, the braking apparatus 30, and/or the steering apparatus 40.

The controller 140 may include at least one memory 142 in which a program for identifying a guardrail is stored and a processor 141 for executing the stored program.

The memory 142 may store programs and/or data for processing the image data, the radar data, and/or the lidar data. Further, the memory 142 may store programs and/or data for generating driving/braking/steering signals.

The memory 142 may temporarily store the image data received from the camera 110, the radar data received from the radar 120, and/or the lidar data received from the lidar 130, and temporarily store processing results of the image data, the radar data, and/or the lidar data by the processor 141.

Further, the memory 142 may include a high-definition map (HD Map). Unlike general maps, the high-definition map may include detailed information about surfaces of roads or intersections such as lane lines, traffic lights, intersections, and road signs. In particular, in the high-definition map, landmarks (e.g., lane lines, traffic lights, intersections, and road signs) that a vehicle encounters while driving are implemented in 3D.

The memory 142 may include not only volatile memories such as a static random-access memory (S-RAM) and a dynamic random-access memory (D-RAM), but also non-volatile memories such as a flash memory, a read only memory (ROM), and an erasable programmable read only memory (EPROM).

The processor 141 may process the image data of the camera 110, the radar data of the radar 120, and/or the lidar data of the lidar 130. For example, the processor 141 may fuse the image data, the radar data, and/or the lidar data and output fusion data.

The processor 141 may generate a driving signal, a braking signal, and/or a steering signal for controlling the driving apparatus 20, the braking apparatus 30, and/or the steering apparatus 40, respectively, based on processing the fusion data. For example, the processor 141 may predict a collision with an object around the vehicle 1 using the fusion data and control the driving apparatus 20, the braking apparatus 30, and/or the steering apparatus 40 to steer or brake the vehicle 1 accordingly.

The processor 141 may include the image processor that processes the image data of the camera 110, the signal processor that processes the radar data of the radar 120 and/or the lidar data of the lidar 130, or a micro control unit (MCU) that generates driving/braking/steering signals.

As described above, the controller 140 may provide the driving signal, the braking signal, or the steering signal based on the image data of the camera 110, the radar data of the radar 120, or the lidar data of the lidar 130.

Meanwhile, when a vehicle travels on a road with a guardrail, a signal of a specific target may be reflected by the guardrail, and thus false signals may occur. The false signals may degrade detection or tracking performance in situations where detection or tracking of a specific target is required. Particularly, in the operation of the blind spot detection function, the false signals may cause the blind spot detection function to output an incorrect warning. Accordingly, the driving assistance apparatus may prevent this problem by identifying a guardrail when a vehicle is traveling on a road with the guardrail.

Figure 3A:
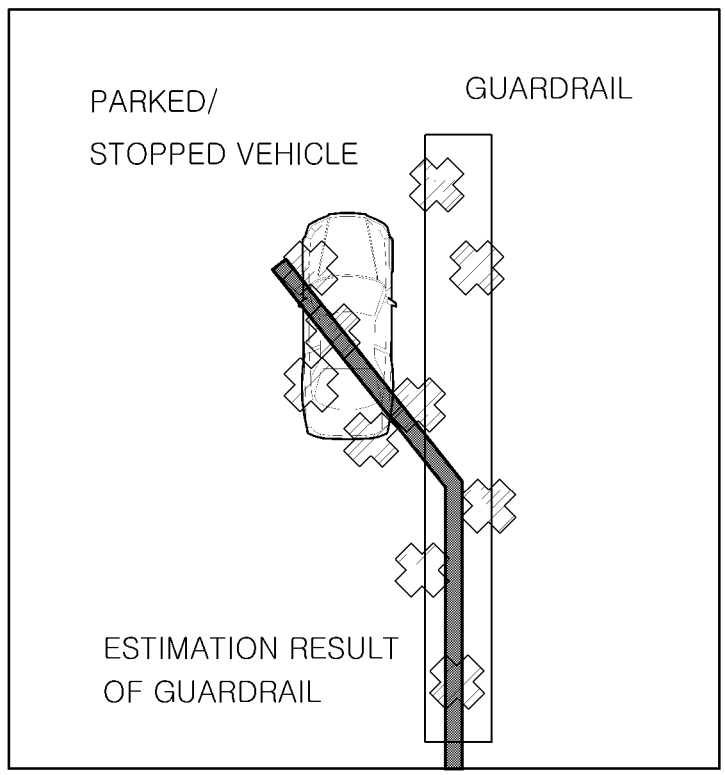
FIGS. 3A and 3B illustrate a case where a guardrail is misidentified by structures surrounding the guardrail.
Figure 3B:
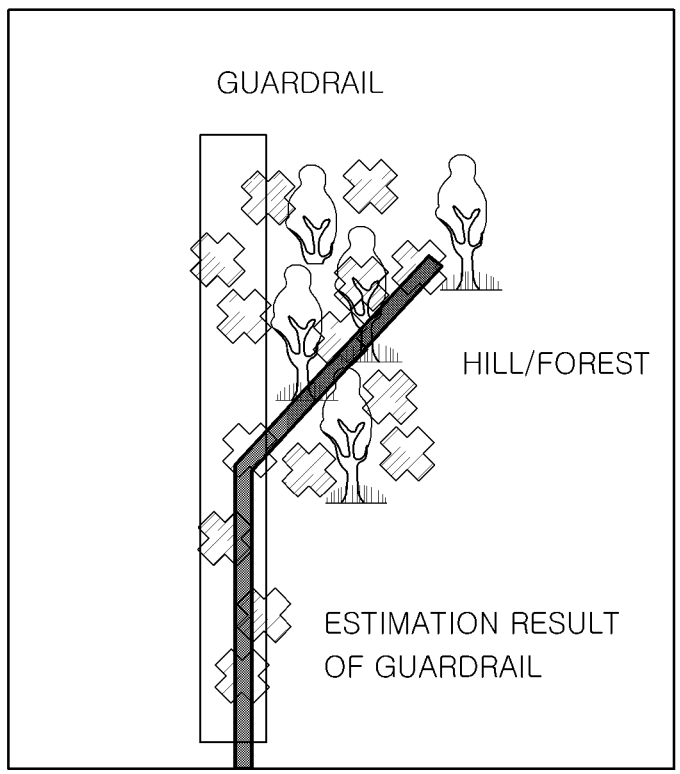

FIGS. 3A and 3B illustrate a case where a guardrail is misidentified by structures surrounding the guardrail.

As illustrated in FIGS. 3A and 3B, the guardrail may be misidentified due to a structure such as a vehicle parked or stopped around the guardrail or a surrounding environment such as a hill or forest around the guardrail. Such misidentification of the guardrail may cause performance degradation or poor reliability of various functions that operate based on guardrail identification.

Therefore, the disclosed embodiment provides a driving assistance apparatus capable of more accurately identifying a guardrail even in situations where misidentification of the guardrail may occur due to a structure or environment around the guardrail. Hereinafter, specific operations of the driving assistance apparatus 100 in accordance with the disclosed embodiment will be described in more detail below.

Figure 4:
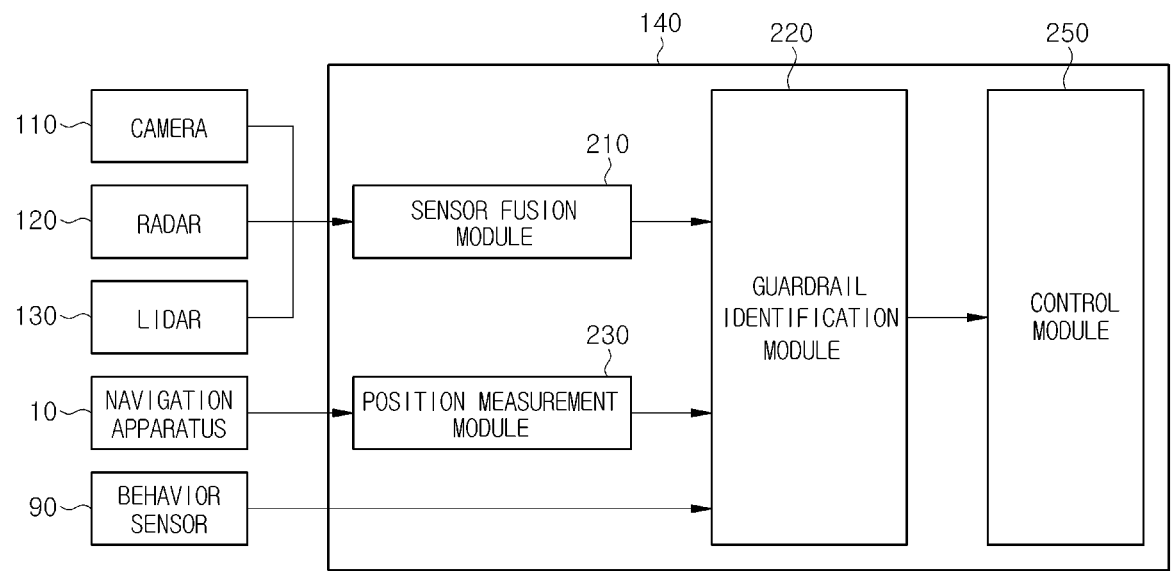
FIG. 4 illustrates function modules of a controller included in a driving assistance apparatus in accordance with one embodiment.
Figure 5:
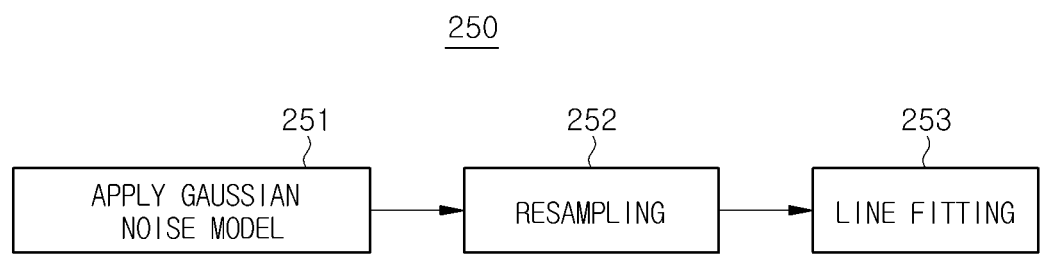
FIG. 5 is a diagram in which a guardrail identification module illustrated in FIG. 4 is embodied.
Figure 6:
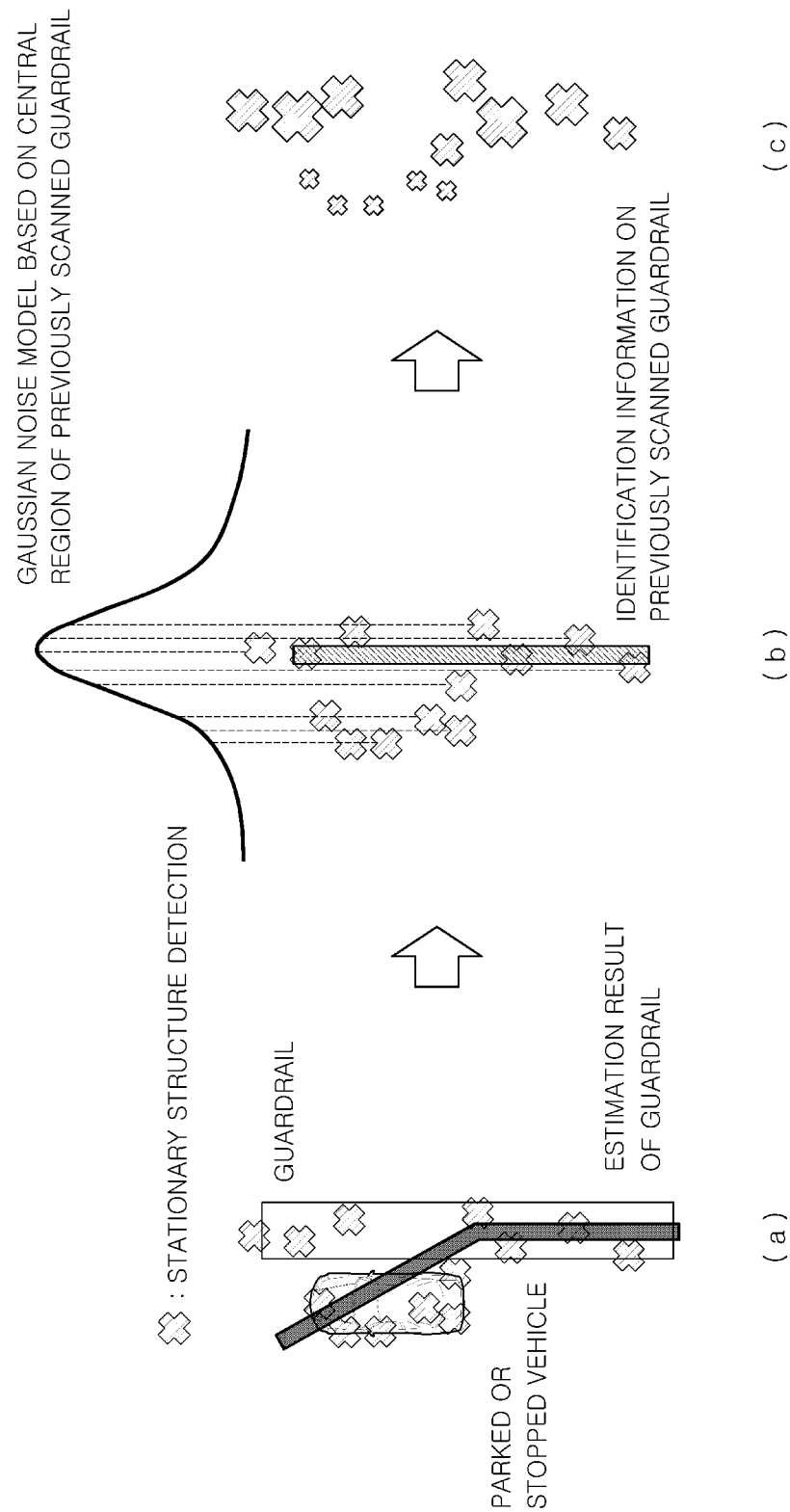
FIG. 6 illustrates a case of identifying a guardrail by applying a Gaussian noise model in accordance with the disclosed embodiment.
Figure 7:
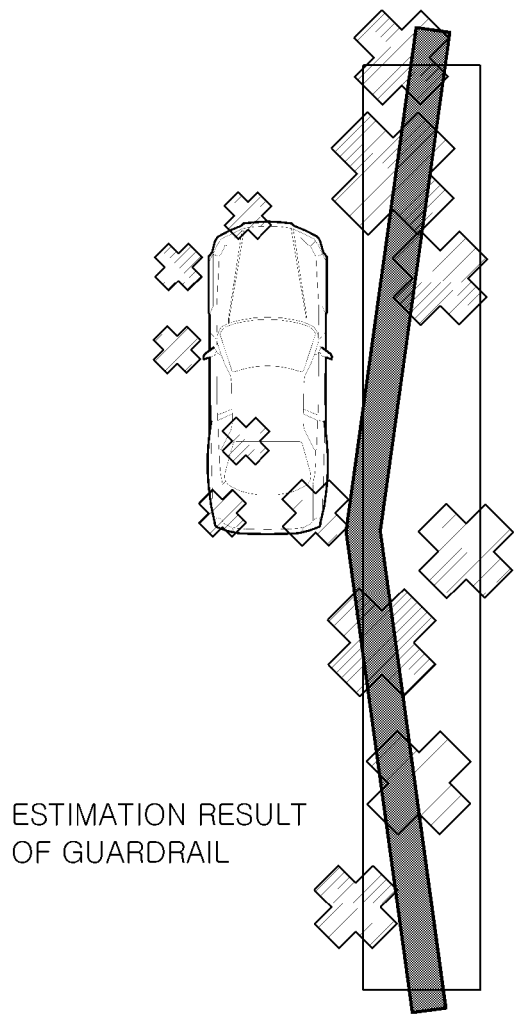
FIG. 7 illustrates a case of identifying a guardrail by applying a Gaussian noise model in accordance with the disclosed embodiment.
Figure 8:
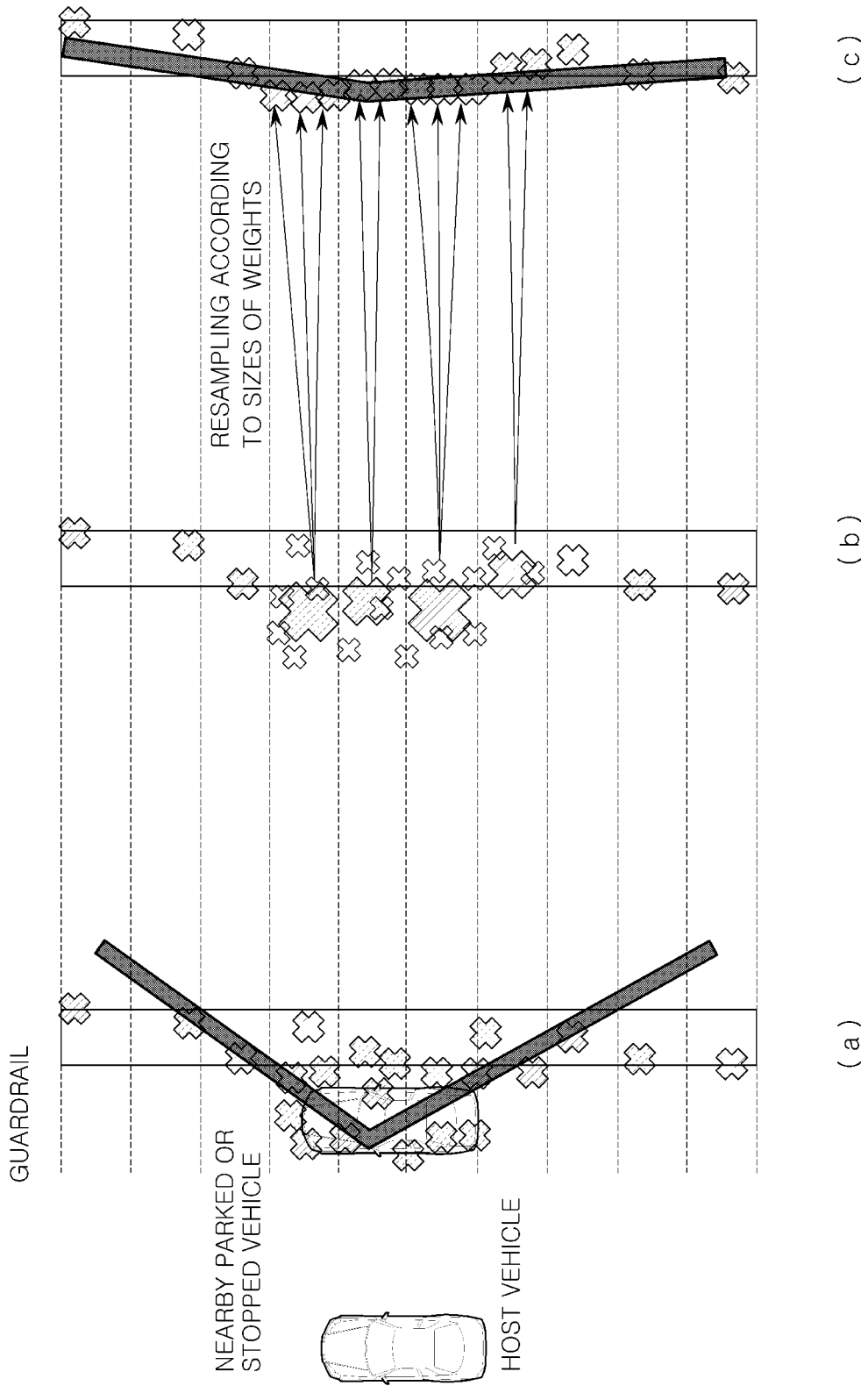
FIG. 8 illustrates a case of identifying a guardrail by applying resampling in accordance with the disclosed embodiment.

FIG. 4 illustrates function modules of a controller included in a driving assistance apparatus in accordance with one embodiment. FIG. 5 is a diagram in which a guardrail identification module illustrated in FIG. 4 is embodied. FIG. 6 illustrates cases of identifying a guardrail by applying a Gaussian noise model in accordance with the disclosed embodiment, and FIG. 7 illustrates a case of identifying a guardrail by applying a Gaussian noise model in accordance with the disclosed embodiment. FIG. 8 illustrates a case of identifying a guardrail by applying resampling in accordance with the disclosed embodiment.

The controller 140 may functionally include a plurality of modules. Each of the modules may be a hardware module (e.g., an ASIC or FPGA) included in the processor 141 or a software module (e.g., an application program or data) stored in the memory 142.

The controller 140 may include a sensor fusion module 210, a position measurement module 230, a guardrail identification module 220, and a control module 250, as illustrated in FIG. 4.

The sensor fusion module 210 of the controller 140 may fuse image data of the camera 110, radar data of the radar 120, and lidar data of the lidar 130 and output information on the surrounding objects of the vehicle 1.

The sensor fusion module 210 may identify a relative position (angle to the driving direction) and/or classification (e.g., whether an object is another vehicle, a pedestrian, a cyclist, or a guardrail, or the like) of the image data. The sensor fusion module 210 may identify a relative position (distance from the vehicle) and/or a relative speed of the radar data. In addition, the sensor fusion module 210 may identify a relative position (distance from the vehicle and/or angle to the driving direction) and/or a relative speed of the lidar data.

The sensor fusion module 210 may match the image data, the radar data, and the lidar data with each other and obtain fusion data based on the matching. For example, the sensor fusion module 210 may identify overlapping portions among the image data, the radar data, and the lidar data based on position information of the image data, position information of the radar data, and position information of the lidar data.

In addition, the sensor fusion module 210 may integrate information of the image data, the radar data, and/or the lidar data. The sensor fusion module 210 may integrate information (e.g., position information and speed information) of the image data obtained from the camera 110, information (e.g., position information and speed information) of the radar data obtained from the radar 120, and information (e.g., position information and speed information) of the lidar data obtained from the lidar 130.

The sensor fusion module 210 may provide the fusion data and information (e.g., information on the classification, position, and speed) on the fusion data to the guardrail identification module 220.

The position measurement module 230 of the controller 140 may obtain map data and position information about the vehicle 1 from the navigation apparatus 10. The position measurement module 230 may identify the position of the vehicle 1 based on the map data and the position information about the vehicle 1. In other words, the controller 140 may identify absolute coordinates of the vehicle 1. The position measurement module 230 may provide the map data and the information on the position of the vehicle 1 to the guardrail identification module 220.

The guardrail identification module 220 of the controller 140 may identify the guardrail based on the image data, the radar data, the lidar data, or fusion data thereof transmitted from the sensor fusion module 210, position information about the vehicle transmitted from the position measurement module, and data related to behavior of the vehicle, such as vehicle speed, transmitted from the behavior sensor 90.

The guardrail identification module 220 determines a stationary state or a moving state of the data input from the sensor fusion module 210 and accumulates the data indicating the stationary state for N frames. That is, the guardrail identification module 220 determines the stationary state or moving state of the input data using speed information about a host vehicle and Doppler information about the input data. The guardrail identification module 220 accumulates data to generate a section with a low detection rate for guardrail data and a stable initial trajectory of the guardrail.

The guardrail identification module 220 initializes guardrail identification information (hereinafter referred to as a guardrail track) through a clustering technique using accumulated signal information. In this case, the guardrail identification module 220 may apply a clustering technique such as density based spatial clustering of application with noise (DBSCAN).

The guardrail identification module 220 sets a guardrail region around the guardrail track. The guardrail identification module 220 sorts the clustered pieces of data and then performs first line fitting up and down (251), and selects pieces of data indicating the stationary state nearby as guardrail data as a result of the line fitting.

In addition, the guardrail identification module 220 updates guardrail track information. The guardrail identification module 220 may update the guardrail track information by performing the recursive least square algorithm using information accumulated in the guardrail track and a stationary state signal selected in a current frame. The selected signal may be stored in the guardrail track for N−1 frames.

As described above, the guardrail may be misidentified due to a structure such as a vehicle parked or stopped around the guardrail or a surrounding environment such as a hill or forest around the guardrail (see FIG. 3). Such misidentification of the guardrail may cause performance degradation or poor reliability of various functions that operate based on guardrail identification.

That is, as illustrated in a graph (a) of FIG. 6, when there is a parked or stopped vehicle around the guardrail, upon performing the line fitting, due to the parked or stopped vehicle, the guardrail may be incorrectly identified as extending in a direction different from a direction in which the guardrail actually extends.

The guardrail identification module 220 in accordance with the disclosed embodiment applies a Gaussian noise model to solve this problem (251).

As illustrated in a graph (b) of FIG. 6, the guardrail identification module 220 applies the Gaussian noise model based on a central region of detection data of the guardrail scanned immediately before, that is, data of a previous frame (an N−1 frame), among the detection data.

That is, as illustrated in the graph (b) of FIG. 6, the guardrail identification module 220 applies the Gaussian noise model so that the guardrail detection data of the N−1 frame corresponds to an average region of the Gaussian noise model, and the closer the detection data is to the average of the Gaussian noise model, the greater a weight is applied to the detection data. In FIG. 6, the pieces of detection data are displayed as X-shaped symbols, and the larger the assigned weight, the larger the size of the X-shaped symbol.

As illustrated in a graph (c) of FIG. 6, greater weights are added to the pieces of detection data closer to the average of the Gaussian noise model, so that it can be seen that X-shaped symbols that represent the pieces of detection data closer to the average of the Gaussian noise model are larger than other symbols.

The guardrail identification module 220 may identify the guardrail by performing the line fitting as illustrated FIG. 7 on the pieces of detection data to which the weights are added by applying the Gaussian noise model in this way, thereby preventing misidentification of the guardrail due to a nearby parked or stopped vehicle or the like.

Meanwhile, when a vehicle parked or stopped around a guardrail is positioned close to a sensor such as the radar 120, and a large number of pieces of detection data are detected, the guardrail identification module 220 applies a resampling technique for preventing a phenomenon in which weights are concentrated on a large number of intensively detected pieces of detection data (252).

A graph (a) of FIG. 8 illustrates that a vehicle parked or stopped at a guardrail is detected near a host vehicle, and a large number of pieces of detection data about the nearby parked or stopped vehicle are intensively obtained. In this case, as illustrated in the graph (a) of FIG. 8, it can be seen that a line fitting result for the detection data does not properly follow the actual guardrail.

As described above, the guardrail identification module 220 applies the Gaussian noise model based on a central region of detection data of the guardrail scanned immediately before, that is, data of a previous frame (N−1 frame), among the detection data.

That is, the guardrail identification module 220 applies the Gaussian noise model so that the guardrail detection data of the N−1 frame corresponds to an average region of the Gaussian noise model, and the closer the detection data is to the average of the Gaussian noise model, the greater a weight is applied to the detection data. In a graph (b) of FIG. 8, the pieces of detection data are displayed as X-shaped symbols, and the larger the assigned weight, the larger the size of the X-shaped symbol.

As illustrated in the graph (b) of FIG. 8, larger weights are added to the pieces of detection data closer to the average of the Gaussian noise model, so that it can be seen that X-shaped symbols that represent the pieces of detection data closer to the average of the Gaussian noise model, are larger than other symbols. When the Gaussian noise model is applied, the guardrail identification module 220 may divide the pieces of detection data as illustrated by dashed lines in the graph (b) of FIG. 8 and apply weights to the pieces of detection data.

As illustrated in the graph (b) of FIG. 8, the guardrail identification module 220 applies the resampling technique for preventing the phenomenon in which weights are concentrated on a large number of intensively detected pieces of detection data.

That is, the resampling may be performed so that, as the size of the weight increases, the number of samples obtained through the resampling increases.

However, the guardrail identification module 220 may perform the resampling so that the number of samples does not exceed four upon performing the resampling.

As illustrated in a graph (c) of FIG. 8, the guardrail identification module 220 resamples the weighted pieces of detection data according to sizes of the weights and performs the line fitting on the resampled detection data (253).

As illustrated in the graph (c) of FIG. 8, it can be seen that a result of the line fitting follows the actual guardrail with high accuracy.

The control module 250 may perform controls related to performance of functions that require guardrail identification information, such as the blind spot detection function, based on the guardrail identification information of the guardrail identification module 220.

As described above, when there is a structure of parked or stopped vehicles around the guardrail or the guardrail is not normally identified due to the surrounding environment or the like, the guardrail identification module 220 in accordance with the disclosed embodiment may identify the guardrail more accurately by applying the Gaussian noise model to the detection data and performing the resampling.

Figure 9:
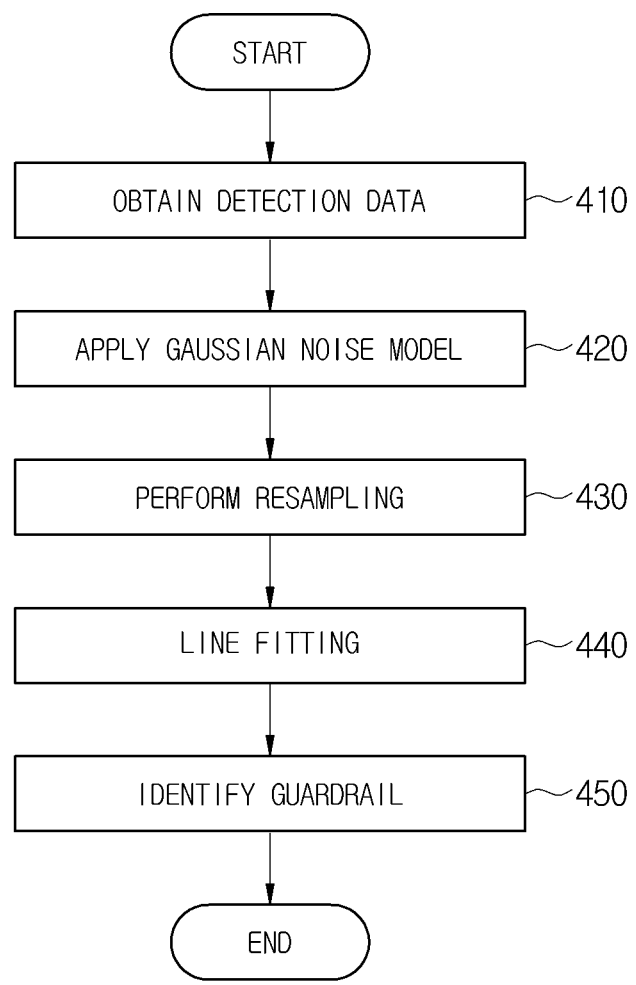
FIGS. 9 and 10 illustrate operations of a driving assistance apparatus in accordance with one embodiment.
Figure 10:
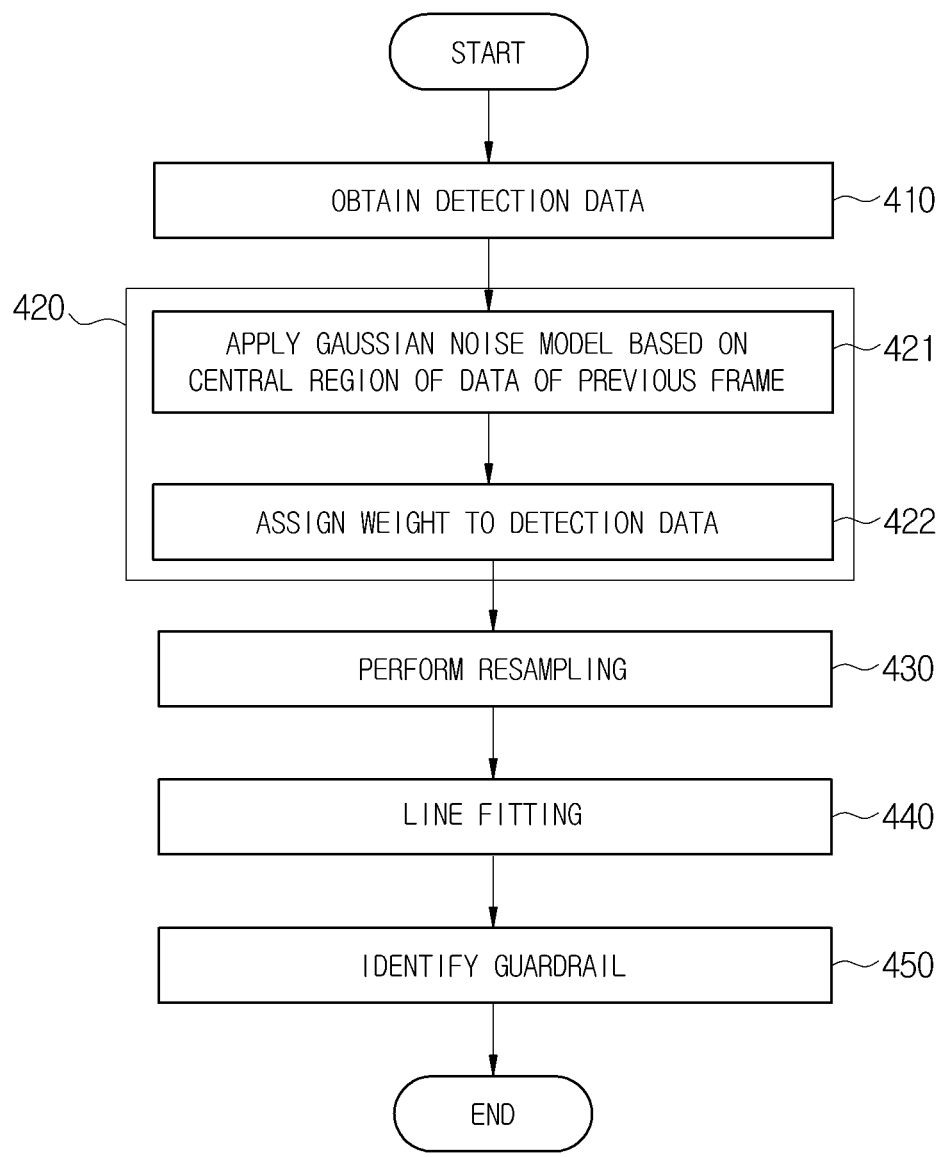

FIGS. 9 and 10 illustrate operations of a driving assistance apparatus in accordance with one embodiment.

Referring to FIG. 9, the controller 140 obtains detection data from the radar 120 or the like (410), and applies a Gaussian noise model to the obtained detection data (420).

The controller 140 may fuse image data of the camera 110, radar data of the radar 120, and lidar data of the lidar 130 and output information on surrounding objects of the vehicle 1.

The controller 140 may identify a relative position (angle to the driving direction) and/or classification (e.g., whether an object is another vehicle, a pedestrian, a cyclist, or a guardrail, or the like) of the image data. The controller 140 may identify a relative position (distance from the vehicle) and/or a relative speed of the radar data. In addition, the controller 140 may identify a relative position (distance from the vehicle and/or angle to the driving direction) and/or a relative speed of the lidar data.

The controller 140 may match the image data, the radar data, and the lidar data with each other and obtain fusion data based on the matching. For example, the controller 140 may identify overlapping portions among the image data, the radar data, and the lidar data based on position information of the image data, position information of the radar data, and position information of the lidar data.

In addition, the controller 140 may integrate information of the image data, the radar data, and/or the lidar data. The controller 140 may integrate information (e.g., position information and speed information) of the image data obtained from the camera 110, information (e.g., position information and speed information) of the radar data obtained from the radar 120, and information (e.g., position information and speed information) of the lidar data obtained from the lidar 130.

The controller 140 may obtain map data and position information about the vehicle 1 from the navigation apparatus 10. The controller 140 may identify the position of the vehicle 1 based on the map data and the position information about the vehicle 1. In other words, the controller 140 may identify absolute coordinates of the vehicle 1.

The controller 140 may identify the guardrail based on the image data, the radar data, the lidar data, or fusion data thereof, position information about the vehicle, and data related to behavior of the vehicle, such as vehicle speed, transmitted from the behavior sensor 90.

The controller 140 determines a stationary or moving state of the detection data and accumulates the data indicating the stationary state for N frames. That is, the controller 140 determines the stationary state or moving state of the data using speed information about a host vehicle and Doppler information about the input data. The controller 140 accumulates data to generate a section with a low detection rate for guardrail data and a stable initial trajectory of the guardrail.

The controller 140 initializes guardrail identification information (hereinafter referred to as a guardrail track) through a clustering technique using accumulated signal information. In this case, the controller 140 may apply a clustering technique such as density based spatial clustering of application with noise (DBSCAN).

The controller 140 sets a guardrail region around the guardrail track. The controller 140 sorts the clustered signals and then performs first line fitting up and down, and selects pieces of data indicating the stationary state nearby as guardrail data as a result of the line fitting.

In addition, the controller 140 updates guardrail track information. The controller 140 may update the guardrail track information by performing the recursive least square algorithm using information accumulated in the guardrail track and data indicating the stationary state selected in a current frame. The selected data may be stored in the guardrail track for N−1 frames.

As described above, the guardrail may be misidentified due to a structure such as a vehicle parked or stopped around the guardrail or a surrounding environment such as a hill or forest around the guardrail (see FIG. 3). Such misidentification of the guardrail may cause performance degradation or poor reliability of various functions that operate based on guardrail identification.

That is, as illustrated in a graph (a) of FIG. 6, when there is a parked or stopped vehicle around the guardrail, upon performing the line fitting, due to the parked or stopped vehicle, the guardrail may be incorrectly identified as extending in a direction different from a direction in which the guardrail actually extends.

The controller 140 in accordance with the disclosed embodiment applies a Gaussian noise model to solve this problem. Referring to FIG. 10, the controller 140 applies the Gaussian noise model based on a central region of detection data of the guardrail scanned immediately before, that is, data of a previous frame (an N−1 frame), among the detection data, as illustrated in the graph (b) of FIG. 6 (421).

That is, as illustrated in the graph (b) of FIG. 6, the controller 140 applies the Gaussian noise model so that the guardrail detection data of the N−1 frame corresponds to an average region of the Gaussian noise model, and the closer the detection data is to the average of the Gaussian noise model, the greater a weight is applied to the detection data (422). In FIG. 6, the pieces of detection data are displayed as X-shaped symbols, and the larger the assigned weight, the larger the size of the X-shaped symbol.

As illustrated in the graph (c) of FIG. 6, greater weights are added to the pieces of detection data closer to the average of the Gaussian noise model, so that it can be seen that X-shaped symbols that represent the pieces of detection data closer to the average of the Gaussian noise model are larger than other symbols.

The controller 140 may identify the guardrail by performing the line fitting as illustrated FIG. 7 on the pieces of detection data to which the weights are added by applying the Gaussian noise model in this way, thereby preventing misidentification of the guardrail due to a nearby parked or stopped vehicle or the like.

Referring to FIG. 9, the controller 140 may apply the Gaussian noise model and then perform resampling (430), perform line fitting (440), and identify the guardrail (450).

Meanwhile, when a vehicle parked or stopped around a guardrail is positioned close to a sensor such as the radar 120, and a large number of pieces of detection data are detected, the controller 140 applies a resampling technique for preventing a phenomenon in which weights are concentrated on a large number of intensively detected pieces of detection data.

The graph (a) of FIG. 8 illustrates that a vehicle parked or stopped at a guardrail is detected near a host vehicle, and a large number of pieces of detection data about the nearby parked or stopped vehicle are intensively obtained. In this case, as illustrated in the graph (a) of FIG. 8, it can be seen that a line fitting result for the detection data does not properly follow the actual guardrail.

As described above, the controller 140 applies the Gaussian noise model based on a central region of detection data of the guardrail scanned immediately before, that is, data of a previous frame (N−1 frame), among the detection data.

That is, the controller 140 applies the Gaussian noise model so that the guardrail detection data of the N−1 frame corresponds to an average region of the Gaussian noise model, and the closer the detection data is to the average of the Gaussian noise model, the greater a weight is applied to the detection data. In the graph (b) of FIG. 8, the pieces of detection data are displayed as X-shaped symbols, and the larger the assigned weight, the larger the size of the X-shaped symbol.

As illustrated in the graph (b) of FIG. 8, larger weights are added to the pieces of detection data closer to the average of the Gaussian noise model, so that it can be seen that X-shaped symbols that represent the pieces of detection data closer to the average of the Gaussian noise model, are larger than other symbols. When the Gaussian noise model is applied, the controller 140 may divide the pieces of detection data as illustrated by dashed lines in the graph (b) of FIG. 8 and apply weights to the pieces of detection data.

As illustrated in the graph (b) of FIG. 8, the controller 140 applies the resampling technique for preventing the phenomenon in which weights are concentrated on a large number of intensively detected pieces of detection data.

In this case, the controller 140 may perform the resampling according to a size of the weight. That is, the resampling may be performed so that, as the size of the weight increases, the number of samples obtained through the resampling increases. However, the controller 140 may perform the resampling so that the number of samples does not exceed four upon performing the resampling.

As illustrated in the graph (c) of FIG. 8, the controller 140 resamples the weighted pieces of detection data according to sizes of the weights and performs the line fitting on the resampled detection data.

As illustrated in the graph (c) of FIG. 8, it can be seen that a result of the line fitting follows the actual guardrail with high accuracy.

The controller 140 may perform controls related to performance of functions that require guardrail identification information, such as the blind spot detection function, based on the guardrail identification information.

As is apparent from the above description, when there is a structure of parked or stopped vehicles around the guardrail or the guardrail is not normally identified due to the surrounding environment, or the like, a driving assistance apparatus in accordance with the disclosed embodiment can identify the guardrail more accurately by applying the Gaussian noise model to the detection data and performing the resampling.

In accordance with one aspect of the present disclosure, a guardrail can be more accurately identified by distinguishing between the guardrail and its surrounding structures.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) orApplication Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for driving assistance, the apparatus comprising:
   a radar installed in a vehicle, having a detection region outside the vehicle, and configured to provide detection data indicating information about a surrounding environment of the vehicle;
   at least one memory configured to store a program for identifying a guardrail; and
   at least one processor configured to execute the stored program and identify the guardrail based on the detection data and behavior data indicating information about behavior of the vehicle,
   wherein the at least one processor is configured to identify the guardrail by applying a Gaussian noise model to the detection data.

2. The apparatus according to claim 1, wherein the at least one processor is configured to apply the Gaussian noise model based on a central region of guardrail detection data of a previous frame among the detection data.

3. The apparatus according to claim 1, wherein the at least one processor is configured to assign a weight to detection data corresponding to a central region of the Gaussian noise model.

4. The apparatus according to claim 3, wherein the at least one processor is configured to identify the guardrail by performing line fitting focusing on the weighted detection data.

5. The apparatus according to claim 1, wherein the at least one processor is configured to perform resampling on weighted data obtained by applying the Gaussian noise model.

6. The apparatus according to claim 5, wherein the at least one processor is configured to perform the resampling according to a size of the weight, and
   the number of samples subject to the resampling is four or less.

7. The apparatus according to claim 6, wherein the at least one processor is configured to identify the guardrail by performing line fitting on the detection data on which the resampling has been performed.

8. A vehicle comprising:
   an environmental sensor configured to obtain detection data indicating information about a surrounding environment of the vehicle;
   a behavior sensor configured to obtain behavior data indicating behavior of the vehicle;
   at least one memory configured to store a program for identifying a guardrail; and
   at least one processor configured to execute the stored program and identify the guardrail based on the detection data and the behavior data,
   wherein the at least one processor is configured to identify the guardrail by applying a Gaussian noise model to the detection data.

9. The vehicle according to claim 8, wherein the at least one processor is configured to apply the Gaussian noise model based on a central region of guardrail detection data of a previous frame among the detection data.

10. The vehicle according to claim 8, wherein the at least one processor is configured to assign a weight to detection data corresponding to a central region of the Gaussian noise model.

11. The vehicle according to claim 10, wherein the at least one processor is configured to identify the guardrail by performing line fitting focusing on the weighted detection data.

12. The vehicle according to claim 8, wherein the at least one processor is configured to perform resampling on weighted data obtained by applying the Gaussian noise model.

13. The vehicle according to claim 12, wherein the at least one processor is configured to perform the resampling according to a size of the weight, and the number of samples subject to the resampling is four or less.

14. The vehicle according to claim 13, wherein the at least one processor is configured to identify the guardrail by performing line fitting on the detection data on which the resampling has been performed.

15. A method for driving assistance, the method comprising:

obtaining, by a radar installed in a vehicle and having a detection region outside the vehicle, detection data indicating information about a surrounding environment of the vehicle;

obtaining behavior data indicating behavior of the vehicle from a behavior sensor provided in the vehicle; and identifying a guardrail based on the detection data and the behavior data, wherein the identifying of the guardrail includes identifying the guardrail by applying a Gaussian noise model to the detection data.

16. The method according to claim 15, wherein the identifying of the guardrail includes applying the Gaussian noise model based on a central region of guardrail detection data of a previous frame among the detection data.

17. The method according to claim 15, wherein the identifying of the guardrail by applying the Gaussian noise model includes assigning a weight to detection data corresponding to a central region of the Gaussian noise model.

18. The method according to claim 17, wherein the identifying of the guardrail by applying the Gaussian noise model includes identifying the guardrail by performing line fitting focusing on the weighted detection data.

19. The method according to claim 15, further comprising performing resampling on weighted data obtained by applying the Gaussian noise model.

20. The method according to claim 19, wherein the performing of the resampling includes performing the resampling according to a size of the weight, and the number of samples subject to the resampling is four or less.

* * * * *